United States Patent [19]
Goksel

[11] 3,770,416
[45] Nov. 6, 1973

[54] TREATMENT OF ZINC RICH STEEL MILL DUSTS FOR REUSE IN STEEL MAKING PROCESSES

[75] Inventor: Mehmet Adnan Goksel, Houghton, Mich.

[73] Assignee: Board of Control of Michigan Technological University, Houghton, Mich.

[22] Filed: Apr. 17, 1972

[21] Appl. No.: 244,769

[52] U.S. Cl. .................................. 75/25, 75/1, 75/3
[51] Int. Cl. ............................................. C21b 3/04
[58] Field of Search ....................... 75/3, 4, 5, 25, 1

[56] References Cited
UNITED STATES PATENTS
| | | | |
|---|---|---|---|
| 3,313,617 | 4/1967 | Ban | 75/5 |
| 3,524,743 | 8/1970 | Hellwig | 75/25 |
| 3,653,874 | 4/1972 | Schulte | 75/3 |
| 3,567,428 | 3/1971 | Svensson | 75/3 |
| 2,417,493 | 3/1947 | Holz | 75/25 |

Primary Examiner—L. Dewayne Rutledge
Assistant Examiner—Peter D. Rosenberg
Attorney—John W. Michael et al.

[57] ABSTRACT

Crush-resistant, metallized agglomerates, containing substantially no zinc or lead and capable of being charged to various steel-making furnaces, are produced from dust recovered from the fumes of a basic oxygen or open hearth steel-making furnace by forming a moistened mixture of (a) the dust (b) finely divided solid carbonaceous material containing sufficient carbon to make the total equivalent fixed carbon content of the mixture about 5 to about 25 weight percent, based on the dry weight of the mixture, (e) a bonding agent in the range of about 5 to about 25 weight percent, based on the dry weight of the mixture, and (d) one or more additional strengthening agents in minor amounts; forming the resultant mixture into green agglomerates; hydrothermally hardening partially dried or dried agglomerates at a temperature substantially below the combustion or decomposition temperature of the carbonaceous material; and then heating the hardened agglomerates at an elevated temperature for a sufficient time to reduce the iron oxide to metallic iron and to reduce and volatilize the zinc, lead and other reducible impurities therein.

11 Claims, 1 Drawing Figure

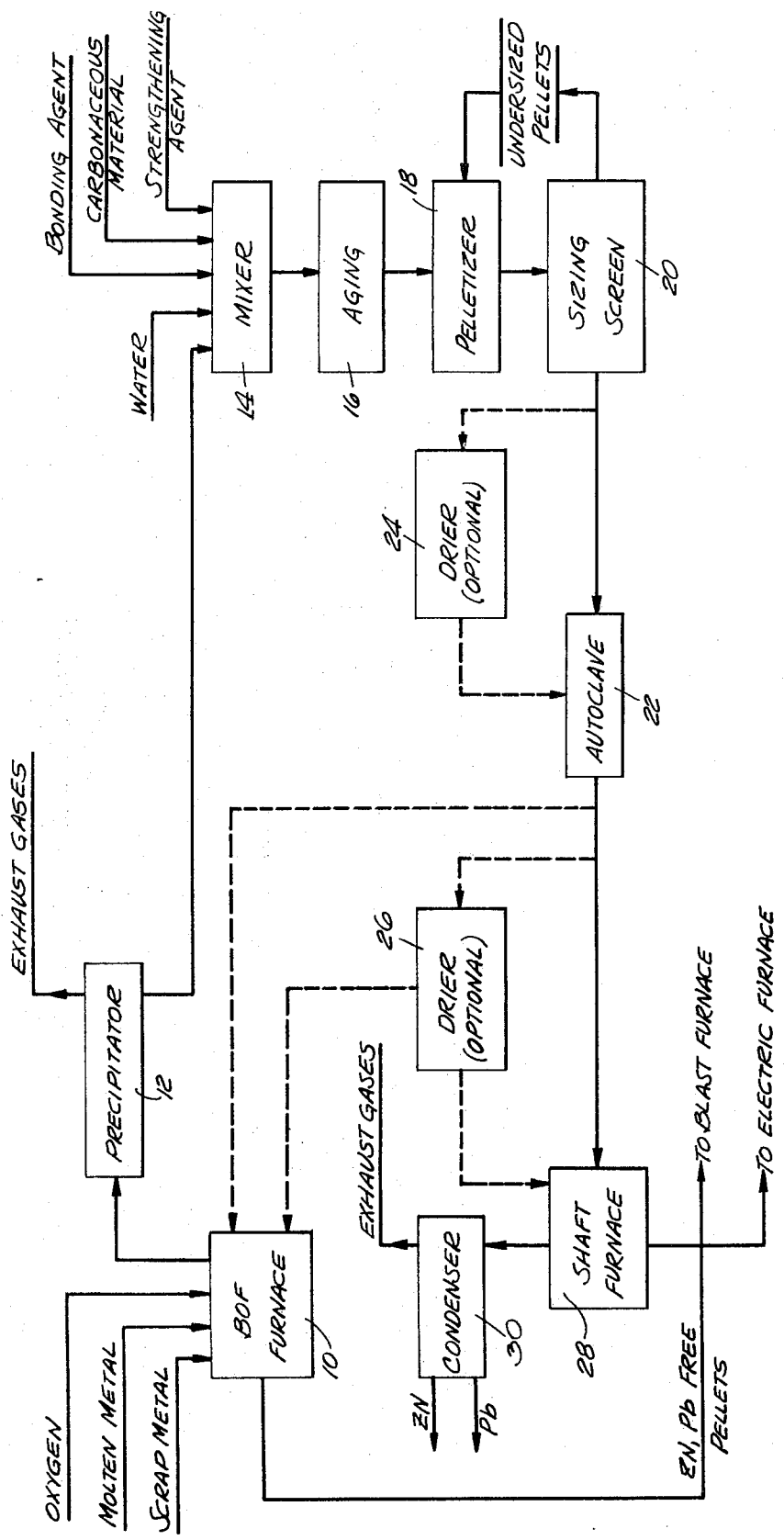

TREATMENT OF ZINC RICH STEEL MILL DUSTS FOR REUSE IN STEEL MAKING PROCESSES

BACKGROUND OF THE INVENTION

This invention relates to a method for producing hardened agglomerates from zinc-rich steel mill fume dusts which are suitable for a steel making furnace charge. More particularly, this invention relates to the process for producing such agglomerates which are substantially free from zinc and lead impurities.

Primarily because of economic considerations, there has been a recent trend towards an increased use of the basic oxygen processes for the production of steel. In this process, oxygen is blown onto or beneath the surface of the molten metal. The fumes from such processes contain considerable amounts of finely divided oxidized iron material, commonly known as BOF dust. The dust is collected by mechanical or electrostatic precipitators to minimize atmospheric pollution and to recover the valuable materials from the fumes. A certain amount of scrap metal is customarily charged to the process. Since some of the scrap typically contains zinc and/or lead the dust removed from the fumes usually include some zinc and lead, as well as iron oxide, because of the volatility of zinc and lead. The dust recovered from the fumes from open hearth processes also can include zinc and/or lead.

The recovered BOF dust generally cannot be directly recycled to the steel making furnace since the material is so fine that it will be blown out of the furnace during injection of the oxygen. Also, recycle of the BOF dust to the blast furnace is generally not possible because of the deleterious effect of the contained zinc and lead on the blast furnace operation. Therefore, it is desirable to agglomerate the BOF dust prior to recycle to the BOF furnace, and furthermore, it is desirable to prepare these agglomerates in such a way that their zinc and lead content might be removed conveniently while recovering the iron values in the steel making furnace.

A considerable amount of effort has been devoted to developing various methods for handling the dust and reclaiming the iron, zinc and lead values. Various leaching and pyroprocessing techniques have been proposed for removing zinc and lead from the dust. The leaching processes employ various media including hydrochloric acid, sulfuric acid, and ammonium carbonate. Generally, the leaching processes do not completely remove zinc from the silicates and ferrites commonly present in BOF dust. The proposed pyroprocessing techniques generally provide a more effective removal of zinc and lead; however, they all have certain practical disadvantages.

In one proposed prior art technique, such as described in U.S. Pat. No. 3,386,816, a premoistened mixture of BOF dust and an acid and/or a binder, such as bentonite, is formed into balls. The green balls are dried and then introduced into a rotary kiln where they are tumbled in the presence of a particulated, solid reductant, such as coke. The balls are retained in the kiln for 45 minutes to 3 hours at a temperature of 1,600° to 2,500°F to reduce the iron oxide and reduce and volatilize zinc, lead and other reducible impurities. With this process an extended time period (with a corresponding cost for maintaining the high temperatures) is required to complete the desired reduction. Also, a separation step is required to separate the unused solid reductant from the hardened balls. This patent specifically teaches that the balls should contain small amounts of internal solid reductant to prevent the compressive strength of the dried balls from being reduced to an unacceptable level for handling and tumbling.

It has also been proposed to reduce pelletized steel mill dust by heating the green pellets in the presence of a reducing gas, such as reformed methane. In addition to requiring the use of natural gas which is short in supply in this country, the hardened pellets produced by this process often have low compressive strengths and cannot withstand the extensive handling and transferring required by modern ore treating processes.

In still another proposed prior art technique, such as disclosed by U.S. Pat. No. 3,262,771 the steel mill dust is mixed with about 25–35% coal and 0–10% limestone, the resultant admixture is pelletized, the green pellets are sintered in a traveling grate furnace at a temperature of about 1,800°–2,300°F to char bond the pellets, while calcining the limestone and partially reducing the iron oxide in the pellets, and the pellets are finally heated in an electric furnace to convert the iron oxide into iron and volatilize the zinc, which is withdrawn as an overhead vapor. U.S. Pat. No. 3,146,088 discloses a similar process where green briquettes having a porosity of more than 20% are formed from a mixture of blast furnace dust and open hearth furnace dust, which has been adjusted to have a predetermined carbon content. The porous green briquettes are then fired at 1,000° to 1,250°C and the zinc and lead are recovered from the overhead vapor.

With these processes the unhardened green pellets must be carefully handled prior to introduction into the sintering furnace to prevent them from being broken up. Also, a considerable amount of the coal is combusted during the sintering step so the sintering conditions must be carefully controlled to insure sufficient carbon is available in the pellet to provide the desired reduction during the final heating step. Furthermore, the high temperatures required for the sintering step results in high operational costs because of the amount of heat energy required.

SUMMARY OF THE INVENTION

A primary object of this invention is to provide a process for producing high strength agglomerates from zinc-rich steel mill waste dusts which are substantially free from zinc and lead impurities and are suitable as a charge to a steel making process.

Another object of this invention is to provide such a process whereby a solid reductant is incorporated within the agglomerate, so that the content thereof can be closely controlled to produce a rapid and substantially complete reduction of the iron, zinc, lead and other reducible impurities, and yet the resultant agglomerate has sufficient strength to withstand handling and transportation prior to being reduced.

The process of this invention broadly includes the steps of preparing a moistened admixture of a zinc-rich steel mill dust, finely divided solid carbonaceous material and a bonding agent, aging the moistened admixture for a sufficient time to hydrate the overburnt lime and/or slag contained in the dust, forming this aged admixture into agglomerated form, hydrothermally curing the agglomerates at a relatively low temperature to a hardened, crush-resistant form, and then heating the hardened agglomerates at an elevated temperature to completely volatilize the zinc and lead and metallize the iron oxide therein. The hydrothermal curing step is carried out at a temperature substantially below the combustion or decomposition temperature of the carbonaceous material, so the amount incorporated into the green agglomerates remains available for the subsequent reduction step.

BRIEF DESCRIPTION OF THE DRAWINGS

The single drawing is a schematic flow diagram of the process of this invention.

DESCRIPTION OF THE PREFERRED EMBODIMENTS

Referring to the drawing, finely divided, particulate dust is removed from the fumes emanating from a BOF furnace 10 by a conventional fume abatement device 12, such as an electrostatic precipitator. Th dust typically comprises 40 to 70% iron, 3 to 15% CaO, 1 to 5% $SiO_2$, 0.01 to 15% Zn, 0.01 to 3% Pb and small amounts of other impurities, such as MgO, $Al_2O_3$ and the like. Because of the high temperature of formation, the BOF dust particles are relatively fine and are primarily spherically shaped. Typically, they have a size distribution of about 80% being less than 0.8 micron and about 20% being between about 0.1 and about 0.3 micron. Some of the BOF dust particles may be as fine as 0.05 micron. The separated dust is conveyed to a conventional mixer 14, such as a pug mill, whrein it is mixed with a finely divided solid carbonaceous material, a bonding agent and sufficient water to form a moistened admixture capable of being formed into discrete agglomerated masses. Optionally, one or more strengthening additives and other steel mill waste fines, such as open hearth dust, scarfer grit, mill scale and spark box fines can be included in the admixture.

Open hearth dust is quite similar to BOF dust but generally contains less slag and overburnt lime. Scarfer grit is produced when the surface of steel ingots are ground to remove the outer oxidized coating prior to various finishing operations. Various abrasive materials, such as sand, aluminum oxide and cast iron fines are mixed in this dust, so the composition thereof can vary. Mill scale consists primarily of metallic iron containing some iron oxides and contamination from hot top refractories. The larger particles can be separated and returned to the blast furnace but the finer particles require agglomeration before they can be reused and can be added to the admixture along with BOF dust. The chemical composition of spark box fines is very similar to BOF dust, but the particles are generally somewhat larger and consist mostly of irregularly shaped, fused slag and iron oxides. It has been found that amounts of one or more of these other steel mill waste fines, in amounts ranging up to 75 weight of the total weight of the fines used in the admixture, produces resultant, hardened agglomerates having superior compressive strengths. Scarfer grit is the preferred of these other steel mill waste fines.

The moistened admixture is transferred to an aging apparatus 16 to hydrate the overburnt lime and/or slag typically contained in BOF dust and other steel mill waste fines used. The aged admixture is then transferred to a conventional forming means, such as a pelletizer 18, wherein it is formed into a discrete agglomerated form. The green agglomerates are screened to a predetermined, substantially uniform size, which is advantageous for charging to steel making furnace, in a conventional screening device 20. The under sized pellets are recycled to the pelletizer for further agglomeration. The sized, green agglomerates are either introduced directly into a reaction chamber, such as an autoclave 22, or first transferred to a conventional drier 24, where they are at least partially dried to remove a majority of the moisture content therein before being introduced into the autoclave. In the autoclave the green or dried agglomerates are heated to an elevated temperature under pressure and in the presence of moisture to effect a hardening and bonding of the particles into an integral, high strength agglomerate. The aged admixture is preferably pelletized and cured hydrothermally generally in accordance with the process disclosed in U.S. Pat. No. 3,235,371.

Although the hardened agglomerates removed from the autoclave have reasonably high compressive strengths after being cooled, their strength can be increased further by transferring them to a conventional drier 26 where they are rapidly dried. In any event the hardened agglomerates can be stored, transported and even charged to a steel making process if the zinc and lead content therein does not exceed a predetermined level at which furnace damage and/or undesirable metallurgical properties result. To remove the zinc and lead, the hardened agglomerates are introduced into a conventional zinc removal furnace, such as a shaft furnace 28, where they are heated to an elevated temperature at which the iron oxide therein is converted to metallic iron by the reducing action of the carbonaceous material and the zinc, lead and the reducible impurities are reduced and volatilized. The zinc and lead are withdrawn as vapor from the shaft furnace and recovered from the overhead vapors in a conventional manner, such as in a condenser 30. The resultant metallized agglomerates, from which substantially all of the zinc and lead has been removed, can be recycled to the BOF furnace, charged directly to a blast furnace, or even charged to an electric steel making furnace which ordinarily cannot tolerate the presence of any appreciable amounts of zinc.

The solid carbonaceous material used is a carbon containing material, such as coke, coke breeze, anthracite coal, bituminous coal, lignite, and the like. The carbonaceous material is preferably pulverized to approximately the same general fineness as the mill dust; however, it can also somewhat be coarser if desired.

The carbonaceous material should contain free carbon and supply sufficient carbon, in conjunction with the free carbon present in the BOF dust (and the other steel mill waste fines if used) to convert all the iron oxide to metallic iron and reduce the zinc and lead oxides during the reduction step. The temperature of the hydrothermal hardening step is maintained substantially below the combustion temperature of the carbonaceous material, so that substantially all the free carbon of the agglomerate remains available for reduction. Therefore, it is a simple manner to determine the amount of carbonaceous material required to obtain the desired reduction, i.e., an amount corresponding to the available carbon stoichiometrically required to reduce the iron, zinc and lad oxides in the agglomerate. Preferably, the amount of carbonaceous material used is slightly in excess of that stoichiometrically required; however, this excess should be kept to a minimum to prevent unnecessary reductions in compressive strength of the agglomerate and dilution of the resultant iron content of the agglomerate. Generally, the amount of carbonaceous material used in the mixture should contain sufficient carbon to make the total equivalent fixed carbon of the mixture in the range of about 5 to about 25, preferably about 10 to 15 weight percent, based on the total dry weight of the solids in the admixture.

The bonding agent used can be any material capable of bonding the dust particles together under the hydrothermal conditions of th hardening step. Preferred bonding agents include the oxides, hydroxides and carbonates of calcium and magnesium, and mixtures thereof, with lime and hydrated lime being the most preferred.

The quantity of bonding agent used in the admixture may range from about 1% up to as high as 25% or more, based on the total weight of the dry solids in the admixture. Concentrations of bonding agents lower than about 1% produces a hardened agglomerate which has inadequate strength for handling. The upper limit of the concentration of the bonding agent is dictated primarily by the quantity of silica and other slag forming impurities in the collected BOF dust, and the other steel mill waste fines when used. Amounts in excess of this level do not appreciably improve the strength of the hardened agglomerates and dilutes the concentration of iron therein. Preferably, the concentration of bonding agent in the admixture is in the range of about 1 to about 15, most preferably about 3 to about 7, weight percent, based on the total weight of the dry solids in the admixture.

In addition to the steel mill dust, the bonding agent, and the carbonaceous material, other strengthening additives can be added to the admixture to increase the strength of the resultant hardened agglomerate. For example, oxides, hydroxides, carbonate, bicarbonates sulfites, bisulfate and borates of the alkali metals (e.g. potassium and sodium) and mixtures thereof can be added in amounts ranging up to about 1%, calculated as the oxide. Of these, sodium hydroxide, sodium carbonate and sodium bicarbonate are preferred. Although the concentrations of these materials in excess of 1% will provide further strengthening, such higher concentrations may possibly produce corrosion to the linings of most steel making furnaces during subsequent smelting of the agglomerates. Concentrations as low as 0.10 weight percent, based on the total weight of the dry solids in the admixture, produce a measurable increase in agglomerate strength; however, it is generally preferred to include about 0.15 to about 1 weight percent of these strengthening agents.

These strengthening agents are preferably added to the admixture in the form of an aqueous solution which may range in strength and concentration from about 10 to about 75% by weight and preferably a 50% solution. The strengthening agent also can be added in dry form as finely divided particles, but due to their hygroscopicity, toxicity and corrosivity, it is preferred to employ aqueous solutions which provide the further advantage of easier handling and uniform distribution throughout the admixture. The particular concentration of the aqueous solution of the strengthening agents can be varied consistent with consideration of such factors as the water content in the initial green mixture and the optimum water content desired for the specific type of molding, pelletizing, briquetting or extruding operation employed for forming the green agglomerates.

Natural or artificial siliceous materials containing silica, which will react with the fluxing agent under the hydrothermal conditions of the hardening step to form silicate bonds therewith, can be used in lieu of, or in addition to, the above strengthening agents in concentrations ranging from about 0.1 to about 10, preferably about 0.5 to about 3, weight percent, based on the total dry weight of the solids in the admixture. Representative examples of acceptable siliceous materials include bentonite, diatomaceous earth, fuller's earth, portland cement, sodium silicate, pyrogenic silicas, hydrated silicas, ground quartz, silica sand, and calcium, magnesium, and aluminum silicates. Of these, ground quartz and silica sand are preferred.

The average size and distribution of the carbonaceous material, bonding agent and other solid additives included in the admixture, in addition to the water content of the admixture, will vary depending on the composition and size of the dust particles and the particular molding, pelletizing, briquetting or extruding technique employed to form the admiture into green agglomerates. For exmple, when a pelletizing process using a drum or disc to form spherical pellets of the desired size is used, it is generally preferred to control the water content of the admixture within the range of about 3 to about 10 weight percent, based on the total weight of the moistened admixture. On the other hand, when the briquetting roll press is used, moisture contents of about 4 to about 6 weight percent are preferred and the size of the particle and size distribution is less important. It can be appreciated that the particle size range in the mixture as well as the quantity of water containd therein can be optimized for each specific type of dust and technique employed for forming the green agglomerate. The particle size of the carbonaceous material, the bonding agent and the other solid additives can generally range from about 60 mesh to about 400 mesh, preferably all less than about 270 mesh. Particle sizes coarser than about 20 mesh increases the difficulty of obtaining a homogeneous miture of the constituents and, in some cases, provides insufficient surface area to obtain the requisite high strength bond in the resultant hardened agglomerate. Hence, the size of the materials is preferably controlled within the ranges below about 60 mesh and preferably with at least half of the material in sizes less than 270 mesh.

After the admixture has been thoroughly mixed to homogeneously disperse the constituents, it is subjected to a molding, briquetting, pelleting or extruding operation to form green agglomerates of the desired size and configuration providing optimum strength and smelting characteristics. The agglomerates are preferably formed into relatively compact configurations, such as cylinders, spheres, egg shapes, pillows, etc., and substantially devoid any thin sections or sharp angularities which might be susceptible to fracture or breakage during handling. The configuration of the agglomerates is also controlled so that they do not become tightly compacted when stacked together and thereby prevent the passage of a heated moisture-laden fluid therethrough during the subsequent hydrothermal hardening step. Preferably, the agglomerates are in the form of spheres having a diameter ranging from about 5 to about 40, most preferably about 10 to about 15, millimeters.

The green agglomerates usually lose a portion of their moisture content during handling and forming.

Moisture content less than about 3 weight percent generally do not provide sufficient cohesion of the mass, whereas moisture content in excess of about 12 weight percent are sometimes undesirable because the mass is too plastic to retain a formed shape. Hence, moisture content of the green agglomerates prior to the forming step is preferably controlled within the range of about 3 to about 10 weight percent and, more preferably, from about 6 to about 8 weight percent.

A problem often encountered in the hydrothermal hardening of BOF agglomerates is that the BOF dust (and other steel mill waste fines when used) frequently contains appreciable amounts of overburnt lime or slag particles. These materials will cause swelling and degradation of the agglomerates during autoclaving. To overcome this problem the mixture to be used as feed for agglomeration should be aged for a sufficient time for all of this overburnt lime and/or slag to become hydrated before the mixture is formed into green agglomerates. For example, this hydration can be advantageously accomplished by heating the feed mixture within a closed container, in the presence of a moist atmosphere, to about 80°C to about 90°C for about 12 to 24 hours. Lower heating temperatures and shorter times can be used; however, a lesser degree of hydration occurs with a resultant lower strength of the agglomerate. If desired this aging can be performed in an autoclave at higher temperatures and pressure for a shorter period of time. However, use of this technique is generally less preferred because of the higher operational costs required. It can be appreciated that the temperature and time required to obtain the desired hydration is largely dependent upon the concentration of overburnt lime and/or slag in the BOF dust and other steel mill waste fines used and the particle size of these materials, with longer times being required for higher concentrations and larger particles.

After being sized to a predetermined, substantially uniform size advantageous for charging to a steel making furnace, the formed green agglomerates can be charged directly into a chamber or pressure vessel, such as an autoclave, wherein they are heated to an elevated temperature under pressure in the presence of moisture to effect a hardening and bonding of individual particles into an integral, high strength agglomerate. It has been found that hardened agglomerates having superior compressive strength can be produced by first drying the green agglomerates to reduce the moisture content therein to a maximum of about 3 weight percent before subjecting them to the hydrothermal hardening step. This drying can be accomplished in a conventional drying apparatus, such as an oven or open flame device, in the presence of ambient air with the drying temperature used being substantially below the combustion or decomposition temperature of the carbonaceous material. The strength of the resultant agglomerate depends to some extent upon the pressure, temperature, time and moisture content during the hydrothermal hardening step. By increasing the pressure and/or temperature, stronger bonds can be obtained for the same length of time or agglomerates of equal strength can be produced in a shorter time. It can be appreciated that the time, pressure, temperature and amount of bonding agent and/or other strengthening materials required to produce an agglomerate from a specific type of steel mill dust are interrelated and these variables must be optimized in accordance with available equipment and economic considerations to provide a hardened agglomerate of the desired physical and chemical characteristics.

The application of heat to the green or unhardened agglomerates may be achieved in any one of a number of methods. The use of steam is preferred because it simultaneously provides a source of heat and moisture necessary for the hydrothermal reaction. Either saturated steam or superheated steam can be used. However, use of superheated steam at high temperatures produces a dry condition which results in weaker agglomerates. Therefore, it is preferable to use superheated steam with temperatures and pressures close to that of saturated steam.

Temperatures generally ranging from about 200°F to about 700°F, depending upon the particular carbonaceous material used, can be satisfactorily employed to achieve a hardening of the green agglomerates within reasonable time periods. The maximum temperature used should be below that at which fusion or unwanted thermal decomposition of the carbonaceous material and other constituents occur. When the carbonaceous material used contains substances which decompose at relatively low temperatures (e.g. bituminous coal), the maximum temperature should not exceed about 550°F. When coke is used as the carbonaceous material, temperatures as high as 700°F and even higher can be used without effecting an undesirable thermal decomposition. The lowest temperature suitable for initiating a hydrothermal reaction is about 200°F. In view of economic considerations relating to the curing time required for achieving an acceptable bond strength, a lower temperature of about 300°F, preferably about 400°F, is used.

Although the hydrothermal reaction can be achieved at atmospheric pressure, it is preferred to employ pressures greater than atmospheric, i.e., up to pressure approaching the capacity of a conventional pressure vessel, in order to decrease the curing time and to improve the strength of the resultant cured agglomerate.

The use of this hydrothermal hardening step is particularly advantageous because the low hardening temperature (and thus the lower operating costs) required and the neutral atmosphere thereof insures that the zinc, lead and carbonaceous material is retained in the agglomerates. Hence, gaseous pollutants are not emitted and the hardened agglomerates integrally contain sufficient solid reductant to effect the desired reduction in the subsequent heating step. Furthermore, the hardened agglomerates have a sufficient compressive strength (e.g. generally ranging from about 100 to about 600 lbs.) to permit them to be handled quite extensively and even transported considerable distances to off-site steel making processes, if desired.

The compressive strength of the hardened agglomerate can be increased by rapidly drying them immediately after removal from the hydrothermal hardening apparatus instead of allowing them to cool and dry at ambient conditions. This drying can be accomplished at a temperature in the range of about 175°F to about 225°F for 5 to 60 minutes, with the preferred temperature and time being about 200°F and 15 minutes, respectively.

In some basic oxygen steel making processes where the zinc and lead content in the agglomerates will not cause the total content of these impurities in the furnace to exceed tolerable levels, the hardened agglomerates can be recycled to the process without further treatment. In this case, the iron in the agglomerates is metallized and recovered with the remainder of the iron. The zinc and lead in the agglomerates volatilize and again report in the BOF dust. After a number of such cycles, the zinc and lead content in the furnace will eventually exceed tolerable levels. For example, if the normal amount of zinc in the BOF dust is 0.5 weight percent, its content will build up to about 13 weight percent after 26 cycles. It has been shown that some BOF furnaces can be operated with the dust containing zinc up to about 13 weight percent without any deleterious effects. After this level has been reached, a portion of the dust containing an amount of zinc corresponding to that added to the process by the scrap metal charge can be routed to a miniaturized zinc recovery plant to remove zinc, lead, and other reducible impurities therefrom. The thus-treated agglomerates can be recycled, along with the untreated, hardened agglomerates, back to the BOF furnaces. In this manner, the zinc and lead content in the BOF never builds up to an intolerable level.

The zinc recovery plant used can consist of a conventional zinc retorting apparatus, such as a shaft furnace. In the retort step the agglomerates are heated to a temperature in the range of about 1,900°F to about 2,400°F, preferably about 2,000°F to about 2,300°F, for a sufficient time to reduce the iron oxide to metallic iron and to reduce the volatilize zinc, lead and other reducible impurities. Since the agglomerates contain sufficient free carbon for this reduction internally, the kinetics are such that a very rapid reduction can be effected. Hence, the total heat energy required is substantially reduced with a corresponding reduction in overall operational costs. The heating time required to effect this reduction depends primarily upon the amount iron oxide, zinc, lead, fluxing agents and carbonaceous material contained in the agglomerates and the particular retort temperature used. As a guide, with a retort temperature of about 2,300°F, the heating time required to effect a substantially complete metallization and volatilization of zinc and lead will be in the range of about 15 to about 30 minutes.

When it is desired to use the agglomerates as a direct charge to a blast furnace or an electric steel making furnace where the presence of appreciable amounts of zinc and/or lead is intolerable, the hardened agglomerates must be first retorted in the general manner described above. If recovery of zinc is not considered feasible at the steel making plant facility, the untreated, zinc-rich, hardened agglomerates can be transported to a zinc smelting facility for retorting.

The following examples are presented to illustrate the process of this invention and are not to be construed as limitations thereto.

EXAMPLE 1

A moistened, homogenous mixture of BOF dust, bonding agent, carbonaceous material and strengthening agent was prepared in accordance with this invention using the following formulation:

| Material | Weight % |
|---|---|
| BOF dust[1] | 87 |
| Ca(OH)$_2$ (−325 mesh) | 5 |
| SiO$_2$ (−325 mesh) | 3 |
| Carbon[2] (−325 mesh) | 4.33 |
| Water | 10 |

[1] BOF dust analysis: 5.1 weight percent Zn, 57.1 weight percent Fe
[2] Carbon added as anthracite coal fines containing 75.3% fixed carbon Green, spherically-shaped pellets, approximately 15 mm in diameter and having a moisture content of 10.4%, were formed from this mixture with a conventional balling device. The pellets were then hardened in a 5-liter Cenco-Megnel autoclave for 1 hour at 300 psig in a saturated steam atmosphere. The hardened pellets had an average compressive strength of about 228 lb.

Zirconium boats containing seven hardened pellets each were placed in a Leco 2600 tube furnace and the pellets were heated therein at various temperatures and for various time periods. After cooling the reduced pellets were analyzed to determine the degree of zinc removal. The results of these tests were as follows:

| Reduction Temp., °F. | Reduction Time, min. | % Zinc Removal |
|---|---|---|
| 1900 | 5 | 7 |
| 1900 | 30 | 21 |
| 2100 | 5 | 18 |
| 2100 | 30 | 46 |
| 2300 | 5 | 36 |
| 2300 | 30 | 65 |

From these test results, it can be see that, even though a substantial amount of zinc was removed from pellets prepared from a mixture containing less than 5% carbon within a reasonably short time period, considerable zinc remained even though the pellets were heated to 2,300°F for 30 minutes.

EXAMPLE 2

A second batch of hardened pellets was prepared in substantially the same manner as in Example 1, except the BOF dust content in the moistened mixture was 77% and the carbon content was 11.2%. The hardened pellets had an average compressive strength of 207 lb.

The hardened pellets were reduced in the same manner described in Example 1. After cooling the reduced pellets were analyzed to determine degree of zinc removal and the degree of iron metallization was determined for some of the pellets. The results of these tests were as follows:

| Reduction Temp., °F. | Reduction Time, min. | % Zinc Removed | % Iron Metallization |
|---|---|---|---|
| 1900 | 5 | 19 | n.a. |
| 1900 | 15 | 72 | n.a. |
| 2100 | 5 | 71 | 76 |
| 2100 | 15 | 98 | 94 |
| 2300 | 5 | 96 | 86 |
| 2300 | 15 | 100 | 100 |

From these results it can be seen that, by using 11.2 weight percent carbonaceous material in the starting mixture, sufficient carbon remained in the high strength, hardened pellets to permit substantially all the zinc to be removed within 15 minutes heating time at a temperature of 2,100°–2,300°F. Also, the pellets were substantially completely metallized at these same conditions. Furthermore, these results show that substantial amounts of zinc removal and metallization can be effected at temperatures and heating times lower than these more preferred levels.

Tests have been run where mill scale and other steel mill waste dusts are combined with BOF dust with similar results relative to zinc removal and metallization. Because of the high carbon contents of some steel mill waste dusts, these dusts may be admixed with BOF dust in the proper proportions to obtain an equivalent fixed carbon content in the resultant mixture within the range of about 5 to 25 weight percent. In this case it is not necessary to add an additional carbonaceous material to the mixture.

From the above detailed description, it can be appreciated that this invention provides an inexpensive method for forming zinc-rich steel mill waste dusts into crush-resistant, hardened agglomerates which can be easily and rapidly reduced to metallize them and to remove zinc, lead and other reducible impurities.

I claim:

1. A method for making hardened agglomerates suitable for charging to a steel-making furnace from steel mill waste dusts comprising the steps of:
   a. forming a moistened mixture including a finely-divided waste dust recovered from the fumes of a steel-making furnace and containing iron, zinc and overburnt lime, a finely divided solid carbonaceous material and a bonding agent selected from the group consisting of the oxides, hydroxides and carbonates of calcium and magnesium and mixtures thereof, the moisture content of said mixture being in the range of about 3 to about 15 weight percent, said carbonaceous material containing sufficient carbon to make the total equivalent fixed carbon of said mixture in the range of about 5 to about 25 weight percent, based on the total weight of the dry solids in said mixture, and the amount of said bonding agent being in the range of about 1 to about 25 weight percent, based on the total weight of the dry solids in said mixture,
   b. aging the resultant mixture at an elevated temperature for a sufficient time to hydrate substantially all of the overburnt lime therein;
   c. forming the aged mixture into discrete agglomerate masses;
   d. hydrothermally hardening said agglomerates under steam pressure at a temperature below the combustion and decomposition temperature of said carbonaceous material for a time period sufficient to form hard and integrally bonded masses, said hardened agglomerates containing substantially all of the free carbon introduced into said mixture by said carbonaceous material.

2. The method according to claim 1 further comprising the step of:
   e. heating said hardened agglomerates to a temperature within the range of about 1,900°F to about 2,400°F for a sufficient time to remove substantially all of the zinc therein.

3. The method according to claim 1 wherein said waste dust is recovered from the fumes from a basic oxygen furnace.

4. The method according to claim 3 wherein said mixture includes at least one other finely divided iron containing waste material selected from the group consisting of open hearth dust, scarfer grit, mill scale, and spark box fines.

5. The method according to claim 1 wherein said bonding agent is calcium oxide, calcium hydroxide, or a mixture thereof.

6. The method according to claim 5 wherein said mixture includes a siliceous material selected from the group consisting of bentonite, diatomaceous earth, fuller's earth, portland cement, sodium silicate, pyrogenic silicas, hydrated silicas, calcium silicate, magnesium silicate, aluminum silicate, ground quartz, silica sand and mixtures thereof in an amount within the range of about 0.1 to about 10 weight percent, based on the total weight of the dry solids in said mixture.

7. The method according to claim 6 wherein step (b) is carried out in a moist atmosphere at a temperature of about 80°F to about 90°C for about 12 to about 24 hours.

8. The method according to claim 6 wherein step (d) is carried out in the presence of a saturated steam atmosphere at a temperature in the range of about 200°F to about 550°F.

9. The method according to claim 8 including the step of drying said agglomerates to reduce the moisture content thereof to a maximum of about 3 weight percent prior to step (d).

10. The method according to claim 9 including the step of drying said hardened agglomerates immediately after step (d) at a temperature of about 175°F to about 250°F for about 5 to about 60 minutes.

11. The method according to claim 5 wherein said mixture includes silica in an amount within the range of about 0.1 to about 3 weight percent, said bonding agent in an amount within the range of about 1 to about 15 weight percent, and said carbonaceous material in an amount within the range of about 10 to about 15 weight percent, all based on the total weight of the dry solids in said mixture.

* * * * *